(12) United States Patent
Nakamura et al.

(10) Patent No.: US 11,757,136 B2
(45) Date of Patent: Sep. 12, 2023

(54) POWER STORAGE MODULE AND MANUFACTURING METHOD OF POWER STORAGE MODULE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Tomohiro Nakamura, Kariya (JP); Takayuki Hirose, Kariya (JP); Nobuyasu Haga, Seto (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 17/265,570

(22) PCT Filed: Jul. 3, 2019

(86) PCT No.: PCT/JP2019/026538
§ 371 (c)(1),
(2) Date: Feb. 3, 2021

(87) PCT Pub. No.: WO2020/039763
PCT Pub. Date: Feb. 27, 2020

(65) Prior Publication Data
US 2021/0296706 A1 Sep. 23, 2021

(30) Foreign Application Priority Data

Aug. 22, 2018 (JP) .................................. 2018-155531
Aug. 23, 2018 (JP) .................................. 2018-156264

(51) Int. Cl.
*H01M 10/04* (2006.01)
*H01M 10/34* (2006.01)
(Continued)

(52) U.S. Cl.
CPC ....... *H01M 10/282* (2013.01); *H01M 10/288* (2013.01); *H01M 50/103* (2021.01);
(Continued)

(58) Field of Classification Search
None
See application file for complete search history.

(56) References Cited

U.S. PATENT DOCUMENTS

2003/0054244 A1* 3/2003 Fredriksson ........ H01M 10/613
429/185
2003/0194605 A1* 10/2003 Fauteux ............ H01M 10/6554
429/149

(Continued)

FOREIGN PATENT DOCUMENTS

CN 101657930 * 2/2010
CN 110998951 * 4/2020

(Continued)

OTHER PUBLICATIONS https://data.energizer.com/pdfs/nickelmetalhydride_appman.pdf (Year: 2022).*

(Continued)

*Primary Examiner* — Lisa S Park
(74) *Attorney, Agent, or Firm* — Sughrue Mion, PLLC

(57) ABSTRACT

A power storage module includes an electrode laminate including a laminate of a plurality of bipolar electrodes and a negative terminal electrode disposed on one end side of the laminate in a laminating direction, a sealing body provided to surround a side surface of the electrode laminate and sealing an internal space formed between electrodes adja- (Continued)

cent to each other, and an electrolytic solution containing an alkaline solution that is housed in the internal space, both surfaces of a metal plate of the negative terminal electrode are bonded to the sealing body, and a first surplus space surrounded by the sealing body and the metal plate of the negative terminal electrode is present.

12 Claims, 10 Drawing Sheets

(51) Int. Cl.
| | |
|---|---|
| *H01M 10/613* | (2014.01) |
| *H01M 10/6557* | (2014.01) |
| *H01M 10/28* | (2006.01) |
| *H01M 50/186* | (2021.01) |
| *H01M 50/193* | (2021.01) |
| *H01M 50/562* | (2021.01) |
| *H01M 50/566* | (2021.01) |
| *H01M 50/102* | (2021.01) |
| *H01M 50/103* | (2021.01) |
| *H01M 50/184* | (2021.01) |
| *H01G 11/12* | (2013.01) |
| *H01G 11/76* | (2013.01) |
| *H01G 11/82* | (2013.01) |
| *H01G 11/80* | (2013.01) |
| *H01G 11/78* | (2013.01) |

(52) U.S. Cl.
CPC ....... *H01M 50/184* (2021.01); *H01M 50/186* (2021.01); *H01M 50/193* (2021.01); *H01M 50/562* (2021.01); *H01M 50/566* (2021.01)

(56) References Cited

U.S. PATENT DOCUMENTS

2005/0260493 A1* 11/2005 Frederiksson .......... H01M 4/80
29/623.2
2015/0140376 A1* 5/2015 Shaffer, II ............... H01M 6/48
429/72

FOREIGN PATENT DOCUMENTS

| JP | 2011-204386 A | 10/2011 |
| JP | 2018-049801 A | 3/2018 |
| WO | 2018/123520 A1 | 7/2018 |

OTHER PUBLICATIONS

International Preliminary Report on Patentability with a Translation of Written Opinion in International Application No. PCT/JP2019/026538, dated Feb. 23, 2021.

* cited by examiner

POWER STORAGE MODULE AND MANUFACTURING METHOD OF POWER STORAGE MODULE

TECHNICAL FIELD

The present disclosure relates to a power storage module and a manufacturing method of a power storage module.

BACKGROUND ART

As a power storage module of the related art, known is a bipolar battery including a bipolar electrode in which a positive electrode active material layer is formed on a first surface of a metal plate and a negative electrode active material layer is formed on a second surface (refer to Patent Literature 1). The bipolar battery includes, for example, an electrode laminate including a plurality of bipolar electrodes laminated through a separator. On a side surface of the electrode laminate, a sealing body configured to seal an internal space formed between the bipolar electrodes adjacent to each other in a laminating direction of the electrode laminate is provided. An electrolytic solution is housed in this internal space.

CITATION LIST

Patent Literature

[Patent Literature 1] Japanese Unexamined Patent Publication No. 2011-204386

SUMMARY OF INVENTION

Technical Problem

In the electrode laminate, a negative terminal electrode is disposed at, for example, one end of the bipolar electrodes in the laminating direction. The negative terminal electrode is an electrode having a negative electrode active material layer on a first surface of a metal plate. A space between the electrodes adjacent to each other in the electrode laminate is sealed with the sealing body. However, when the electrolytic solution contains an alkaline solution, a so-called alkaline creep phenomenon causes the electrolytic solution that is housed in the internal space to propagate on the surface of the metal plate of the negative terminal electrode, pass between the sealing body and the metal plate, and seep out of the power storage module. If the electrolytic solution leaks out of the power storage module and diffuses, there is a concern that, for example, the corrosion of a conductive plate disposed in contact with the power storage module, a short-circuit between the power storage module and a restraining member, or the like may occur.

The present disclosure has been made in order to solve the above-described problem, and an object of the present disclosure is to provide a power storage module capable of preventing electrolytic solutions from seeping out of the power storage module due to the alkaline creep phenomenon and a manufacturing method of the power storage module.

Solution to Problem

A power storage module according to an aspect of the present disclosure includes an electrode laminate including a laminate of a plurality of bipolar electrodes each having a positive electrode active material layer on a first surface of a metal plate and having a negative electrode active material layer on a second surface of the metal plate and a negative terminal electrode having a negative electrode active material layer on a first surface of a metal plate and disposed on one end side of the laminate in a laminating direction, a sealing body provided to surround a side surface of the electrode laminate and sealing an internal space formed between electrodes adjacent to each other in the laminating direction, and an electrolytic solution containing an alkaline solution that is housed in the internal space, both surfaces of the metal plate of the negative terminal electrode are bonded to the sealing body, and a first surplus space surrounded by the sealing body and the metal plate of the negative terminal electrode is present.

In this power storage module, both surfaces of the metal plate of the negative terminal electrode are bonded to the sealing body, and the first surplus space surrounded by the sealing body and the metal plate of the negative terminal electrode is present. This first surplus space prevents the fluctuation of the humidity in the internal space caused by the infiltration of external moisture, which makes the progress condition of the alkaline creep phenomenon less likely to be satisfied. Therefore, it is possible to prevent the electrolytic solution from seeping out of the power storage module due to the alkaline creep phenomenon.

The electrode laminate may have an outermost metal plate disposed outside the metal plate of the negative terminal electrode in the laminating direction, a surface of the outermost metal plate that faces the metal plate side of the negative terminal electrode is bonded to the sealing body, and a second surplus space surrounded by the sealing body, the metal plate of the negative terminal electrode, and the outermost metal plate may be further present. According to this configuration, in addition to the first surplus space, the second surplus space is positioned on the migration path of the electrolytic solution that propagates on the metal plate of the negative terminal electrode from the internal space and flows out of the power storage module due to the alkaline creep phenomenon. Therefore, the fluctuation of the humidity in the internal space caused by the infiltration of external moisture is more effectively prevented.

An internal pressure of the second surplus space may be lower than an atmospheric pressure. According to this configuration, it is possible to decrease the amount of moisture present in the second surplus space. Therefore, it is possible to make the progress condition of the alkaline creep phenomenon far less likely to be satisfied.

A surface of the outermost metal plate opposite to the surface that faces the metal plate side of the negative terminal electrode may be bonded to the sealing body, and a third surplus space surrounded by the sealing body and the outermost metal plate may be further present. According to this configuration, in addition to the first surplus space and the second surplus space, the third surplus space is positioned on the migration path of the electrolytic solution that propagates on the metal plate of the negative terminal electrode from the internal space and flows out of the power storage module due to the alkaline creep phenomenon. Therefore, the fluctuation of the humidity in the internal space caused by the infiltration of external moisture is more effectively prevented.

The metal plate of the negative terminal electrode may be roughened in a bonding region with the sealing body. According to this configuration, the bonding strength between the sealing body and the metal plate of the negative terminal electrode is improved with an anchor effect. Therefore, it is possible to prevent the sealing body from peeling off from the metal plate of the negative terminal electrode due to the infiltration of the electrolytic solution and to prevent the progress of the alkaline creep phenomenon.

The sealing body may include a plurality of resin portions respectively disposed at edge portions of the metal plates, and outer edge portions of the individual resin portions may be bonded to each other by heat welding. In this case, it is possible to adjust the sizes of the surplus spaces by adjusting the welding amounts of the outer edge portions of the individual resin portions by heat welding.

The metal plate of the negative terminal electrode may have the first surface and a second surface opposite to the first surface, and the sealing body may include a first resin portion bonded to the first surface of the metal plate of the negative terminal electrode and a second resin portion bonded to the second surface of the metal plate of the negative terminal electrode and to the metal plate of the bipolar electrode adjacent to the negative terminal electrode. In this case, the surplus space that is formed on the migration path of the electrolytic solution attributed to the alkaline creep phenomenon is sealed with the first resin portion and the second resin portion. Therefore, the fluctuation of the humidity in the internal space caused by the infiltration of external moisture is prevented, which makes the progress condition of the alkaline creep phenomenon less likely to be satisfied. In addition, the second resin portion is bonded to both the metal plate of the negative terminal electrode and the metal plate of the bipolar electrode, whereby the stiffness of the second resin portion is enhanced. Therefore, it is possible to prevent the second resin portion from peeling off from the metal plate of the negative terminal electrode due to the infiltration of the electrolytic solution attributed to the alkaline creep phenomenon.

The first resin portion and the second resin portion may be turned into an integrally bonded body by heat welding, and the surplus space may be a space surrounded by the bonded body and the metal plate of the negative terminal electrode. In such a case, since the configurations around the negative terminal electrode can be unitized, the manufacturing of the power storage module is simplified.

The metal plate of the negative terminal electrode may be roughened in a bonding region with at least one of the first resin portion and the second resin portion. According to this configuration, the bonding strength between at least one of the first resin portion and the second resin portion and the metal plate of the negative terminal electrode is improved with an anchor effect. Therefore, it is possible to prevent at least one of the first resin portion and the second resin portion from peeling off from the metal plate of the negative terminal electrode due to the infiltration of the electrolytic solution and to prevent the progress of the alkaline creep phenomenon.

A manufacturing method of a power storage module according to an aspect of the present disclosure includes forming a bipolar electrode unit including a laminate of a plurality of bipolar electrodes each having a positive electrode active material layer on a first surface of a metal plate and a negative electrode active material layer on a second surface of the metal plate, forming a negative terminal electrode unit including a negative terminal electrode having a negative electrode active material layer on a first surface of a metal plate and the bipolar electrode, bonding the negative terminal electrode unit to one end side of the bipolar electrode unit in a laminating direction of the laminate and forming an electrode laminate including the plurality of bipolar electrodes and the negative terminal electrode, and forming a sealing body to surround a side surface of the electrode laminate and sealing an internal space formed between electrodes adjacent to each other in the laminating direction in the electrode laminate, and both surfaces of the metal plate of the negative terminal electrode are bonded to the sealing body, thereby sealing a surplus space other than the internal space with the sealing body.

In this manufacturing method of a power storage module, both surfaces of the metal plate of the negative terminal electrode are bonded to the sealing body, thereby sealing the surplus space other than the internal space with the sealing body. This surplus space prevents the fluctuation of the humidity in the internal space caused by the infiltration of external moisture, which makes the progress condition of the alkaline creep phenomenon less likely to be satisfied. Therefore, it is possible to prevent the electrolytic solution from seeping out of the power storage module due to the alkaline creep phenomenon.

In the forming of the negative terminal electrode unit, a first resin portion configuring the sealing body may be bonded to the first surface of the metal plate of the negative terminal electrode in the negative terminal electrode unit, and a second resin portion configuring the sealing body may be bonded to a second surface of the metal plate of the negative terminal electrode in the negative terminal electrode unit and a first surface of the metal plate of the bipolar electrode. In this case, the surplus space that is formed on the migration path of the electrolytic solution attributed to the alkaline creep phenomenon is sealed with the first resin portion and the second resin portion. Therefore, the fluctuation of the humidity in the internal space caused by the infiltration of external moisture is prevented, which makes the progress condition of the alkaline creep phenomenon less likely to be satisfied. In addition, the second resin portion is bonded to both the metal plate of the negative terminal electrode and the metal plate of the bipolar electrode, whereby the stiffness of the second resin portion is enhanced. Therefore, it is possible to prevent the second resin portion from peeling off from the metal plate of the negative terminal electrode due to the infiltration of the electrolytic solution attributed to the alkaline creep phenomenon.

In the forming of the negative terminal electrode unit, the first resin portion and the second resin portion may be turned into an integrally bonded body by heat welding. In such a case, since the configurations around the negative terminal electrode can be unitized, the manufacturing of the power storage module is simplified.

Between the forming of the electrode laminate and the sealing of the internal space, the first resin portion and the second resin portion may be turned into an integrally bonded body by heat welding. In such a case, since the configurations around the negative terminal electrode can be unitized, the manufacturing of the power storage module is simplified.

Advantageous Effects of Invention

According to the present disclosure, it is possible to prevent the electrolytic solution from seeping out of the power storage module due to the alkaline creep phenomenon.

DESCRIPTION OF EMBODIMENTS

Figure 1:
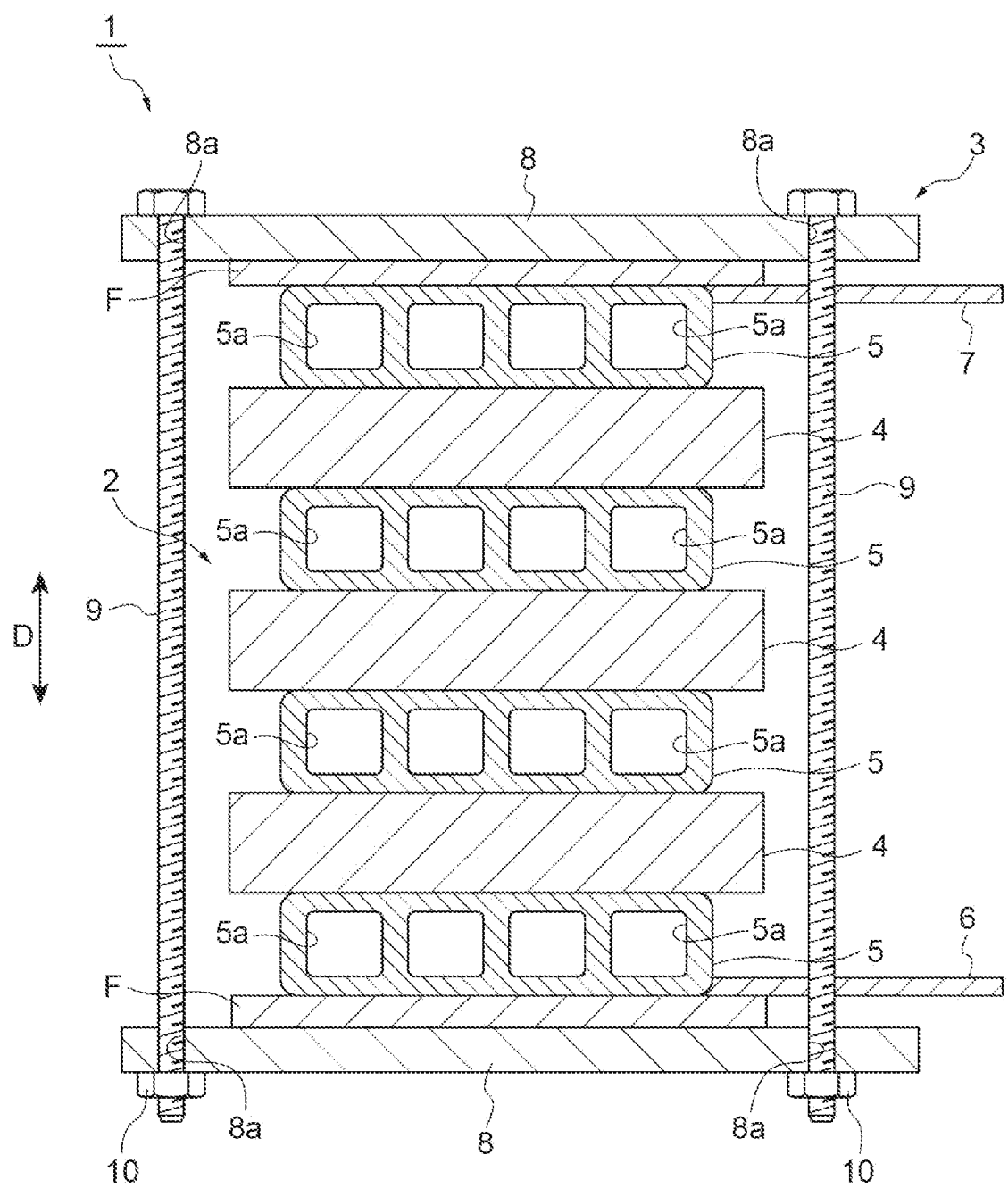
FIG. 1 is a schematic sectional view showing a power storage device according to one embodiment.

Hereinafter, a variety of embodiments will be described in detail with reference to drawings. It should be noted that the same or equivalent portion will be given the same reference numeral in individual drawings and will not be described again.

FIG. 1 is a schematic sectional view showing an embodiment of a power storage device. A power storage device 1 shown in FIG. 1 is used as a battery for a variety of vehicles, for example, a forklift, a hybrid vehicle, an electric vehicle, and the like. The power storage device 1 includes a module laminate 2 including a plurality of laminated power storage modules 4 and a restraining member 3 that applies a restraining load to the module laminate 2 in a laminating direction D of the module laminate 2.

The module laminate 2 includes a plurality of (three) power storage modules 4 and a plurality of (four) conductive plates 5. The power storage module 4 is a bipolar battery and has a rectangular shape when seen in the laminating direction D. The power storage module 4 is, for example, at least one of a secondary battery, such as a nickel metal hybrid secondary battery or a lithium ion secondary battery, an electric double layer capacitor, and the like. In the following description, a nickel metal hybrid secondary battery will be exemplified.

The power storage modules 4 adjacent to each other in the laminating direction D are electrically connected to each other through the conductive plate 5. The conductive plates 5 are each disposed between the power storage modules 4 adjacent to each other in the laminating direction D and disposed outside the power storage modules 4 positioned at the laminate ends. A positive electrode terminal 6 is connected to one conductive plate 5 disposed outside the power storage module 4 positioned at one laminate end. A negative electrode terminal 7 is connected to another conductive plate 5 disposed outside the power storage module 4 positioned at the other laminate end. The positive electrode terminal 6 and the negative electrode terminal 7 are drawn, for example, from the edge portions of the conductive plates 5 in a direction intersecting the laminating direction D. With the positive electrode terminal 6 and the negative electrode terminal 7, the power storage device 1 is charged and discharged.

In the conductive plate 5, a plurality of flow paths 5a configured to circulate a cooling fluid such as air is provided. The flow paths 5a extend along, for example, a direction that intersects (bisects) the laminating direction D and the drawing direction of the positive electrode terminal 6 and the negative electrode terminal 7, respectively. The conductive plate 5 has not only a function as a connection member configured to electrically connect the power storage modules 4 but also a function as a heat dissipation plate configured to dissipate heat generated from the power storage modules 4 by circulating a cooling fluid through these flow paths 5a. It should be noted that, in the example of FIG. 1, the area of the conductive plate 5 seen in the laminating direction D is made smaller than the area of the power storage module 4; however, from the viewpoint of improving the heat dissipation property, the area of the conductive plate 5 may be equal to the area of the power storage module 4 or may be larger than the area of the power storage module 4.

The restraining member 3 includes a pair of end plates 8 configured to interpose the module laminate 2 in the laminating direction D and fastening bolts 9 and nuts 10 configured to fasten the end plates 8. The end plate 8 is a rectangular metal plate having an area slightly larger than the area of the power storage module 4 and conductive plate 5 when seen in the laminating direction D.

Electrically insulating films F are provided on the surfaces of the end plates 8 on the module laminate 2 side. The films F insulate the end plates 8 and the conductive plates 5.

In edge portions of the end plate 8, insertion holes 8a are provided at positions outside the module laminate 2. The fastening bolt 9 is passed from the insertion hole 8a of one end plate 8 toward the insertion hole 8a of the other end plate 8, and the nut 10 is screwed into the distal end portion of the fastening bolt 9 that protrudes from the insertion hole 8a of the other end plate 8. As a result, the power storage modules 4 and the conductive plates 5 are sandwiched by the end plates 8 and unitized as the module laminate 2. In addition, a restraining load is applied to the module laminate 2 in the laminating direction D.

Figure 2:
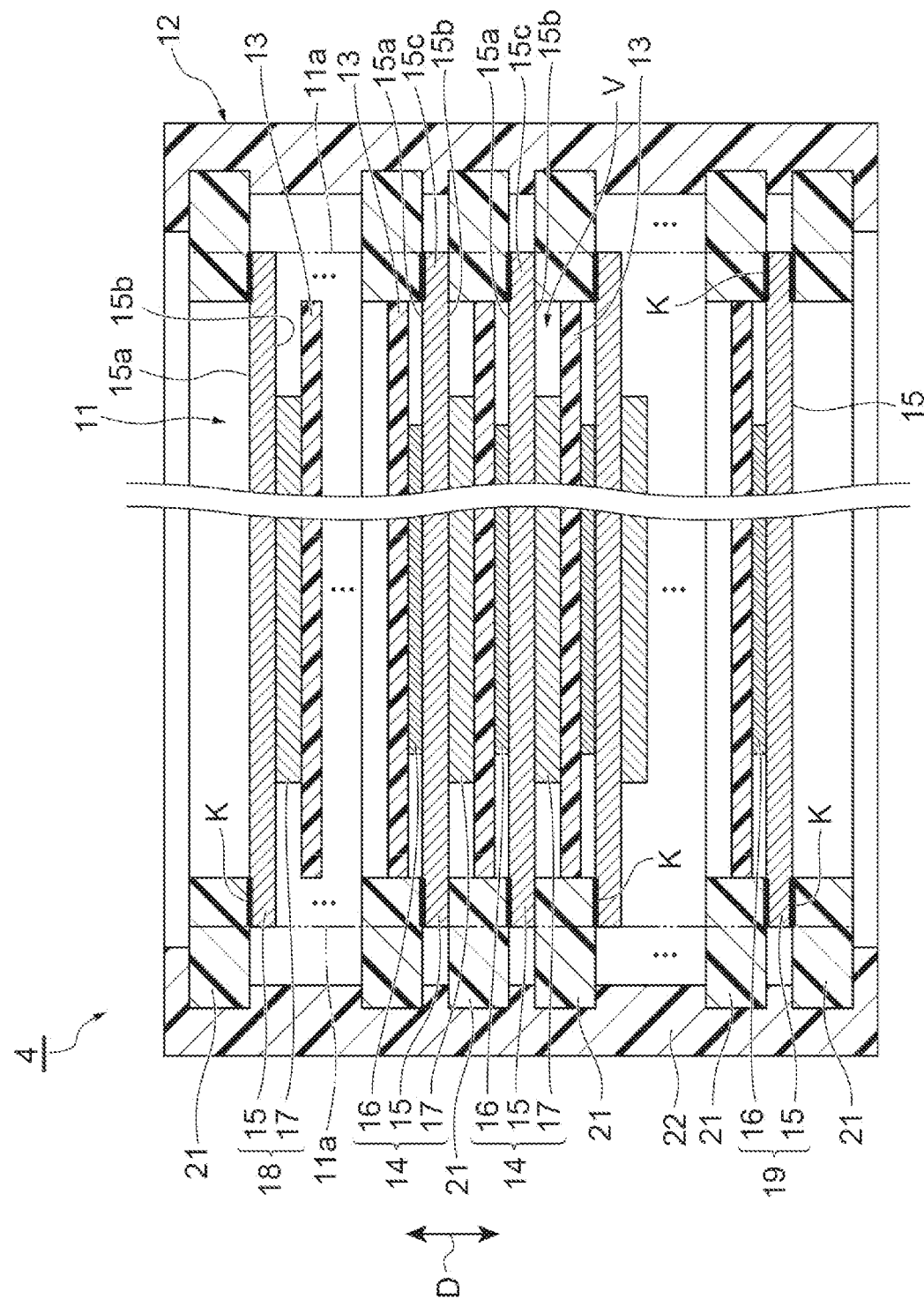
FIG. 2 is a schematic sectional view showing the internal configuration of the power storage module shown in FIG. 1.

Next, the configuration of the power storage module 4 will be described in detail. FIG. 2 is a schematic sectional view showing the internal configuration of the power storage module shown in FIG. 1. As shown in FIG. 2, the power storage module 4 includes an electrode laminate 11 and resin sealing bodies 12 configured to seal the electrode laminate 11. The electrode laminate 11 is made up of a plurality of electrodes laminated along the laminating direction D of the power storage module 4 through separators 13. These electrodes include a laminate of a plurality of bipolar electrodes 14, a negative terminal electrode 18, and a positive terminal electrode 19.

The bipolar electrode 14 has a metal plate 15 including a first surface 15a and a second surface 15b opposite to the first surface 15a, a positive electrode 16 provided on the first surface 15a, and a negative electrode 17 provided on the second surface 15b. The positive electrode 16 is a positive electrode active material layer formed by applying a positive electrode active material to the metal plate 15. The negative electrode 17 is a negative electrode active material layer formed by applying a negative electrode active material to the metal plate 15. In the electrode laminate 11, the positive electrode 16 in one bipolar electrode 14 faces the negative electrode 17 in another bipolar electrode 14 adjacent to the bipolar electrode in the laminating direction D across the separator 13. In the electrode laminate 11, the negative electrode 17 in one bipolar electrode 14 faces the positive electrode 16 in another bipolar electrode 14 adjacent to the bipolar electrode in the laminating direction D across the separator 13. It is noted that the separator 13 preferably extends in a direction intersecting the laminating direction D to come into contact with a first sealing portion 21 described below. Therefore, it is possible to prevent a short-circuit between the electrodes. The separator 13 may be even welded to the first sealing portion 21 instead of being simply in contact with the first sealing portion 21. A stepped portion may be provided in the first sealing portion 21, and an edge portion of the separator 13 may be disposed in the stepped portion.

The negative terminal electrode 18 has a metal plate 15 including a first surface 15a and a second surface 15b opposite to the first surface 15a and a negative electrode 17 provided on the second surface 15b of the metal plate 15. The negative terminal electrode 18 is disposed at one end of the electrode laminate 11 in the laminating direction D such that the second surface 15b faces the central side of the electrode laminate 11 in the laminating direction D. The first surface 15a of the metal plate 15 of the negative terminal electrode 18 configures one outside surface of the electrode laminate 11 in the laminating direction D and is electrically connected to one conductive plate 5 adjacent to the power storage module 4 (refer to FIG. 1). The negative electrode 17 provided on the second surface 15b of the metal plate 15 of the negative terminal electrode 18 faces the positive electrode 16 of the bipolar electrode 14 at one end of the electrode laminate 11 in the laminating direction D through the separator 13.

The positive terminal electrode 19 has a metal plate 15 including a first surface 15a and a second surface 15b opposite to the first surface 15a and a positive electrode 16 provided on the first surface 15a of the metal plate 15. The positive terminal electrode 19 is disposed at the other end of the electrode laminate 11 in the laminating direction D such that the first surface 15a faces the central side of the electrode laminate 11 in the laminating direction D. The positive electrode 16 provided on the first surface 15a of the positive terminal electrode 19 faces the negative electrode 17 of the bipolar electrode 14 at the other end of the electrode laminate 11 in the laminating direction D through the separator 13. The second surface 15b of the metal plate 15 of the positive terminal electrode 19 configures the other outside surface of the electrode laminate 11 in the laminating direction D and is electrically connected to another conductive plate 5 adjacent to the power storage module 4 (refer to FIG. 1).

The metal plate 15 is formed of, for example, metal such as nickel or a nickel-plated steel plate. As an example, the metal plate 15 is a rectangular nickel metal foil. An edge portion 15c of the metal plate 15 has a rectangular frame shape and is an uncoated region to which neither the positive electrode active material nor the negative electrode active material is applied. Examples of the positive electrode active material that forms the positive electrode 16 include nickel hydroxide. Examples of the negative electrode active material that forms the negative electrode 17 include a hydrogen storage alloy. In the present embodiment, a region where the negative electrode 17 is formed on the second surface 15b of the metal plate 15 is slightly larger than a region where the positive electrode 16 is formed on the first surface 15a of the metal plate 15.

The separator 13 is, for example, formed in a sheet shape. Examples of the separator 13 include a porous film formed of a polyolefin-based resin such as polyethylene (PE) or polypropylene (PP), woven fabric or non-woven fabric formed of polypropylene, methyl cellulose, or the like, and the like. The separator 13 may be a separator reinforced with a vinylidene fluoride resin compound.

The sealing body 12 is formed of, for example, an insulating resin in a rectangular frame shape as a whole. The sealing bodies 12 are provided on side surfaces 11a of the electrode laminate 11 to surround the edge portions 15c of the metal plates 15. The sealing bodies 12 hold the edge portions 15c on the side surfaces 11a. The sealing bodies 12 each include a plurality of first sealing portions 21 (resin portions) bonded to the edge portions 15c of the metal plates 15 and a second sealing portion 22 that surrounds the first sealing portions 21 from the outside along the side surface 11a and is bonded to each of the first sealing portions 21. The first sealing portions 21 and the second sealing portion 22 are, for example, an alkali-resistant insulating resin. Examples of a material that configures the first sealing portions 21 and the second sealing portion 22 include polypropylene (PP), polyphenylene sulfide (PPS), modified polyphenylene ether (modified PPE), and the like.

The first sealing portion 21 is continuously provided throughout the entire circumference of the edge portion 15c on the first surface 15a of the metal plate 15 and has a rectangular frame shape when seen in the laminating direction D. The first sealing portion 21 is welded to the first surface 15a of the metal plate 15 by, for example, at least one of ultrasonic waves and heat. The first sealing portion 21 is, for example, a film having a predetermined thickness in the laminating direction D. The inner edge of the first sealing portion 21 is positioned between the edge portions 15c of the metal plates 15 adjacent to each other in the laminating direction D. The outer edge of the first sealing portion 21 projects outward more than the edge of the metal plate 15. The distal end portions of the first sealing portions 21 are held by the second sealing portion 22. The first sealing portions 21 adjacent to each other along the laminating direction D may be separated from each other or may be in contact with each other.

A region where the edge portion 15c and the first sealing portion 21 overlap each other on the first surface 15a of the metal plate 15 forms a bonding region K between the metal plate 15 and the first sealing portion 21. In the bonding region K, the surface of the metal plate 15 is roughened. The roughened region may be only the bonding region K; however, in the present embodiment, the surface on which the bonding region K is formed is fully roughened. Roughening can be realized by, for example, forming a plurality of protrusions by electroplating. Due to the plurality of protrusions formed on the first surface 15a, in the bonding interface with the first sealing portion 21 on the first surface 15a, the resin in a molten state enters portions between the plurality of protrusions formed by roughening, and an anchor effect is exhibited. Therefore, it is possible to improve the bonding strength between the metal plate 15 and the first sealing portion 21. The protrusion that is formed during roughening has a shape that, for example, becomes thicker from the proximal end side toward the distal end side. Therefore, the sectional shape between the protrusions adjacent to each other becomes an undercut shape, and it becomes possible to enhance the anchor effect. It should be noted that, in a case where the surface of the metal plate 15 is roughened by electroplating, the plating layer may have at least one of a single-layer structure and a multi-layer structure. The plating layer may have, for example, a base plating layer and a main plating layer. The plating layer may be, for example, a nickel plating layer.

The second sealing portions 22 are provided outside the electrode laminate 11 and the first sealing portions 21 and configure the external walls (chassis) of the power storage module 4. The second sealing portions 22 are formed by, for example, the injection molding of a resin and extend along the laminating direction D throughout the entire length of the electrode laminate 11. The second sealing portion 22 has a rectangular frame shape extending along the laminating direction D as the axial direction. The second sealing portions 22 are welded to the outer edge portions of the first sealing portions 21 with, for example, heat generated during the injection molding.

The first sealing portions 21 and the second sealing portions 22 seal internal spaces V formed between the electrodes adjacent to each other. More specifically, the second sealing portions 22 seal, together with the first sealing portions 21, spaces between the bipolar electrodes 14 adjacent to each other along the laminating direction D, spaces between the negative terminal electrode 18 and the bipolar electrode 14 adjacent to each other along the laminating direction D, and spaces between the positive terminal electrode 19 and the bipolar electrode 14 adjacent to each other along the laminating direction D, respectively. Therefore, air-tightly partitioned internal spaces V are formed between the bipolar electrodes 14 adjacent to each other, between the negative terminal electrode 18 and the bipolar electrode 14, and between the positive terminal electrode 19 and the bipolar electrode 14, respectively. In these internal spaces V, for example, an electrolytic solution (not shown) containing an alkali solution such as a potassium hydroxide aqueous solution is housed. The separators 13, the positive electrodes 16, and the negative electrodes 17 are impregnated with the electrolytic solution.

Figure 3:
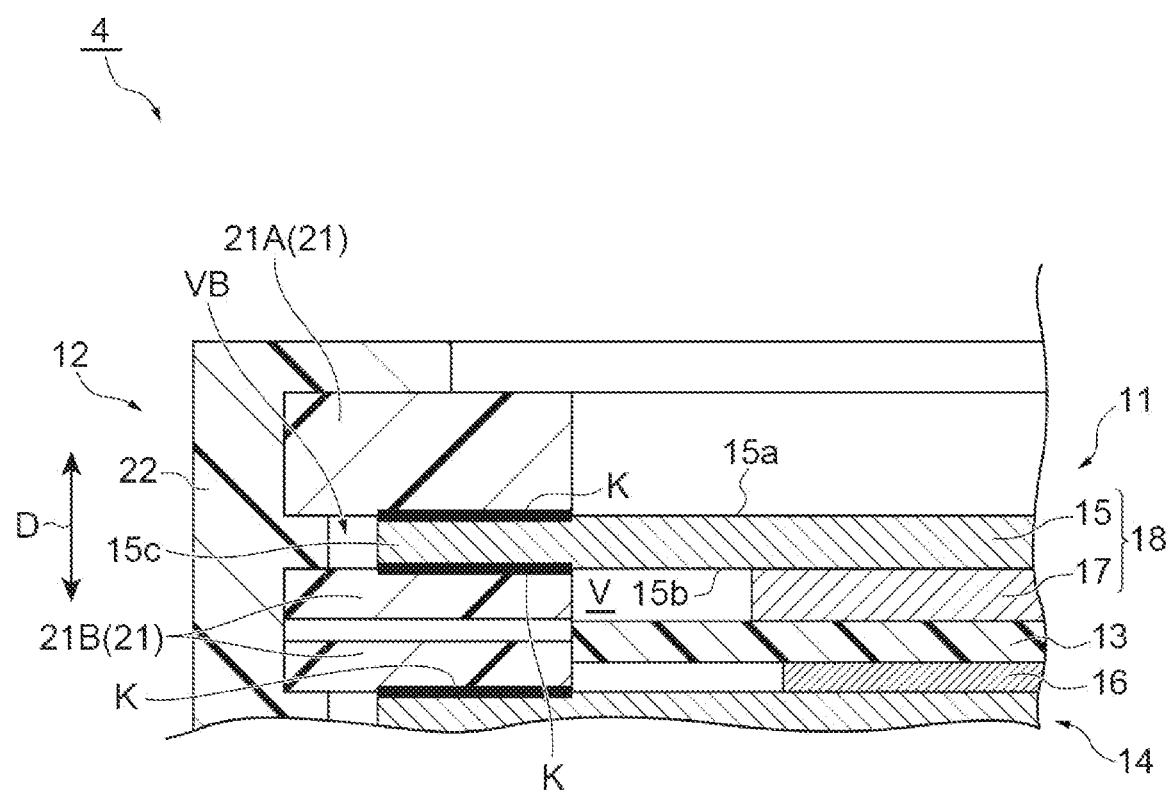
FIG. 3 is an enlarged sectional view of a main part of the power storage module of FIG. 2.

Here, as shown in FIG. 3, in the present embodiment, both surfaces of the metal plate 15 of the negative terminal electrode 18 are bonded to the sealing body 12. That is, in the present embodiment, the first sealing portion 21 is bonded to both the first surface 15a and the second surface 15b of the metal plate 15 of the negative terminal electrode 18. More specifically, the first sealing portion 21 includes a first sealing portion 21A bonded to the first surface 15a of the metal plate 15 of the negative terminal electrode 18 and a first sealing portion 21B bonded to the second surface 15b of the metal plate 15 of the negative terminal electrode 18. In addition, in the present embodiment, a separate first sealing portion 21B is bonded to the first surface 15a of the metal plate 15 of the bipolar electrode 14 laminated adjacent to the negative terminal electrode 18. That is, the first sealing portion 21B is also bonded to the first surface 15a of the metal plate 15 of the bipolar electrode 14 that faces the second surface 15b of the metal plate 15 of the negative terminal electrode 18. In the negative terminal electrode 18, the bonding regions K are provided on both the first surface 15a and the second surface 15b of the metal plate 15, and both surfaces of the metal plate 15 are roughened.

The first sealing portion 21A and the first sealing portion 21B each, similar to the other first sealing portion 21, have a rectangular frame shape when seen in the laminating direction D and are continuously provided throughout the entire circumference of the edge portion 15c of the metal plate 15. The first sealing portion 21A and the first sealing portion 21B are, for example, films having a predetermined thickness in the laminating direction D. Since two layers of the first sealing portions 21B are disposed between the metal plate 15 of the negative terminal electrode 18 and the metal plate 15 of the bipolar electrode 14, the thickness of the first sealing portion 21B is smaller than the thickness of the first sealing portion 21A. In the present embodiment, the thickness of the first sealing portion 21B is approximately half the thickness of the first sealing portion 21A. As an example, the thickness of the first sealing portion 21B can be set to 50 μm or more and 150 μm or less. It should be noted that the thickness of the first sealing portion 21B can be appropriately set depending on the distance between the metal plates 15 and 15 adjacent to each other.

As described above, the first sealing portion 21A is bonded to the first surface 15a of the metal plate 15 of the negative terminal electrode 18, and the first sealing portion 21B is bonded to the second surface 15b, whereby, in the power storage module 4, a surplus space other than the internal spaces V is sealed with the sealing body 12. More specifically, as shown in FIG. 3, the power storage module 4 has a surplus space (first surplus space) VB surrounded by the sealing body 12 and the metal plate 15 of the negative terminal electrode 18. The surplus space VB is surrounded by the first sealing portions 21 (the first sealing portion 21A and the first sealing portion 21B), the second sealing portion 22, and the metal plate 15 of the negative terminal electrode 18. The surplus space VB is a closed space where the electrolytic solution is not housed and is provided on the migration path of the electrolytic solution when the alkaline creep phenomenon occurs in the power storage module 4. The surplus space VB is formed to surround the outside of the edge portion 15c of the metal plate 15 of the negative terminal electrode 18.

Figure 4:
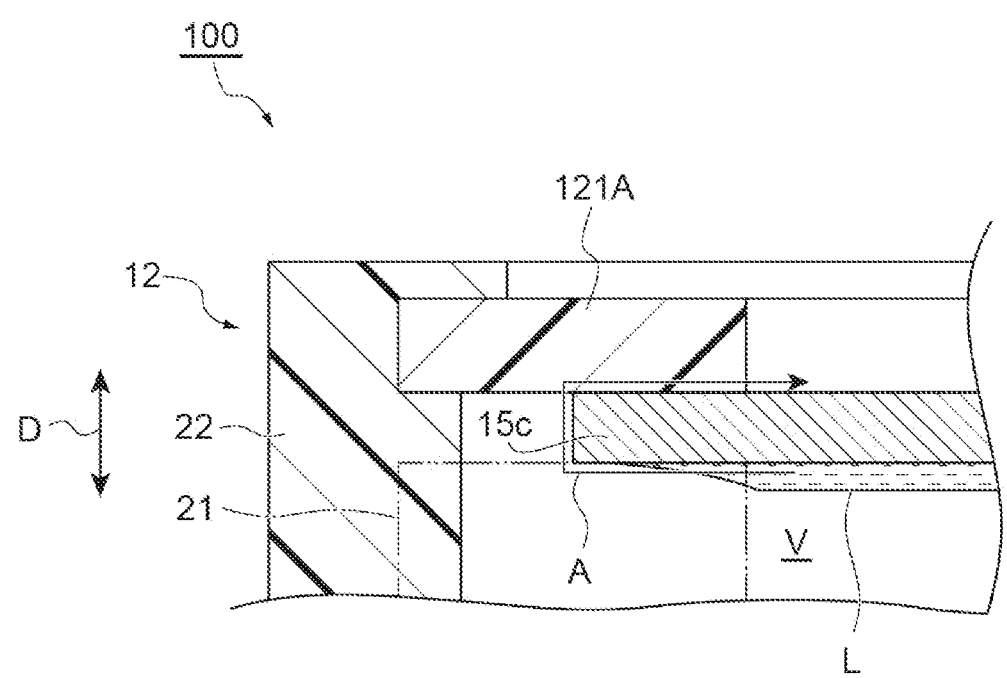
FIG. 4 is an enlarged sectional view of a part of a power storage module according to a comparative example.

Subsequently, the operation and effect of the power storage module 4 will be described with reference to FIG. 4. FIG. 4 is an enlarged sectional view of a main part of a power storage module according to a comparative example. As shown in FIG. 4, a power storage module 100 according to the comparative example is different from the power storage module 4 in terms of the fact that a first sealing portion 121A is bonded only to the first surface 15a of the metal plate 15 of the negative terminal electrode 18 and the first sealing portion is not bonded to the second surface 15b.

In the power storage module 100, there is a case where the so-called alkaline creep phenomenon causes the electrolytic solution that is present in the internal spaces V to propagate on the surface of the metal plate 15 of the negative terminal electrode 18, pass between the metal plate 15 and the first sealing portion 121A in the bonding region K, and seep out on the first surface 15a side of the metal plate 15. In FIG. 4, the migration path of an electrolytic solution L during the alkaline creep phenomenon is indicated by the arrow A. This alkaline creep phenomenon can occur while power storage devices are charged and discharged and no load is applied to power storage devices due to an electrochemical factor, a fluid phenomenon, or the like. The alkaline creep phenomenon occurs due to the presence of each of a negative electrode potential, moisture, and the passage of the electrolytic solution L and progresses over time.

In contrast, in the power storage module 4 according to the present embodiment, both surfaces (the first surface 15a and the second surface 15b) of the metal plate 15 of the negative terminal electrode 18 are each bonded to the sealing body 12 (the first sealing portion 21A and the first sealing portion 21B). In this power storage module 4, the surplus space VB other than the internal spaces V is formed by the sealing body 12 and the metal plate 15 of the negative terminal electrode 18. This surplus space VB prevents the fluctuation of the humidity in the internal spaces caused by the infiltration of external moisture, which makes the progress condition of the alkaline creep phenomenon less likely to be satisfied. Therefore, it is possible to prevent the electrolytic solution from seeping out of the power storage module due to the alkaline creep phenomenon.

In addition, in the power storage module 4, the surplus space VB is surrounded by the sealing body 12 and the metal plate 15 of the negative terminal electrode 18, and the surplus space VB is positioned on the migration path of the electrolytic solution that propagates on the metal plate 15 of the negative terminal electrode 18 from the internal spaces V and seeps out of the power storage module 4 due to the alkaline creep phenomenon. Therefore, the fluctuation of the humidity in the internal spaces V caused by the infiltration of external moisture is more effectively prevented.

In addition, in the power storage module 4, the first surface 15a and the second surface 15b of the metal plate 15 are each roughened in the bonding regions K of the first sealing portion 21A and the first sealing portion 21B with the metal plate 15 of the negative terminal electrode 18. Therefore, it is possible to improve the bonding strength between the first sealing portion 21A and the metal plate 15 of the negative terminal electrode 18 and the bonding strength between the first sealing portion 21B and the metal plate 15 of the negative terminal electrode 18 with the anchor effect. Therefore, it is possible to prevent the first sealing portion 21A and the first sealing portion 21B from peeling off from the metal plate 15 of the negative terminal electrode 18 due to the infiltration of the electrolytic solution and to prevent the progress of the alkaline creep phenomenon.

Figure 5:
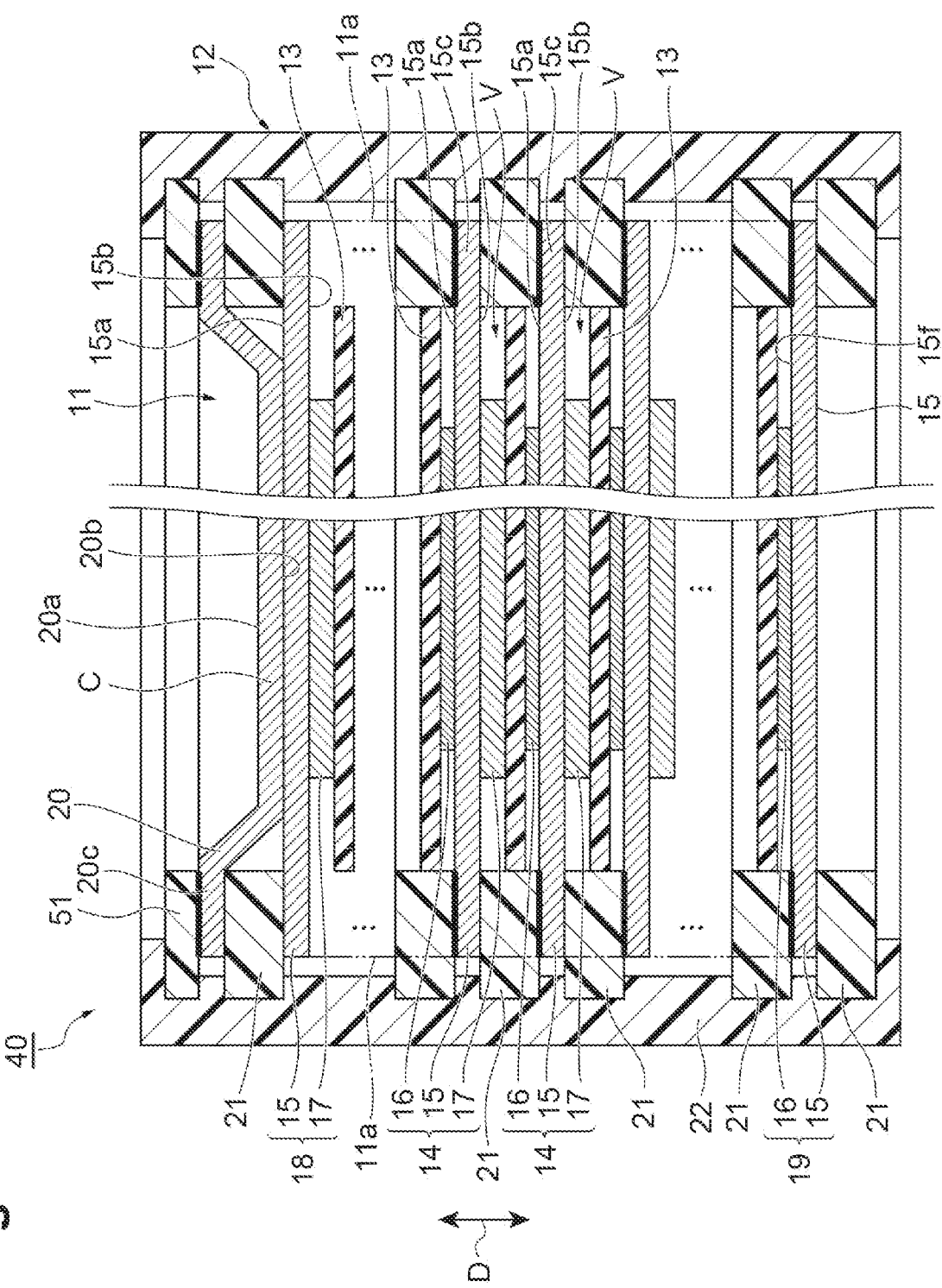
FIG. 5 is a schematic sectional view showing the internal configuration of a power storage module according to a modification example.

Next, a power storage module 40 according to a modification example will be described with reference to FIG. 5. FIG. 5 is a schematic sectional view showing the internal configuration of the power storage module 40 according to the modification example. Similar to the power storage module 4, the power storage module 40 includes the electrode laminate 11 and the resin sealing bodies 12 configured to seal the electrode laminate 11. The electrode laminate 11 is made up of a plurality of electrodes laminated along the laminating direction D through the separators 13. These electrodes include the laminate of the plurality of bipolar electrodes 14, the negative terminal electrode 18, and the positive terminal electrode 19. The power storage module 40 is different from the power storage module 4 in terms of the fact that the electrode laminate 11 further has a metal plate (outermost metal plate) 20.

The metal plate 20 is disposed outside the metal plate 15 of the negative terminal electrode 18 in the laminating direction D. The metal plate 20 has a second surface 20b that faces the first surface 15a of the metal plate 15 of the negative terminal electrode 18 and a first surface 20a opposite to the second surface 20b. Neither the positive electrode active material nor the negative electrode active material is applied to the first surface 20a and the second surface 20b of the metal plate 20, and the first surface 20a and the second surface 20b are entirely uncoated regions. That is, the metal plate 20 is an uncoated metal plate that is provided with neither the positive electrode 16 nor the negative electrode 17. In addition, the metal plate 20 has a contact portion C that is in contact with the metal plate 15 of the negative terminal electrode 18. In the contact portion C, the second surface 20b of the metal plate 20 is in contact with the first surface 15a of the metal plate 15 of the negative terminal electrode 18, and the first surface 20a of the metal plate 20 is in contact with the conductive plate 5 (refer to FIG. 1). Therefore, the negative terminal electrode 18 is electrically connected to the conductive plate 5 through the metal plate 20. Similar to the metal plate 15, the metal plate 20 is formed of, for example, metal such as nickel or a nickel-plated steel plate.

On the first surface 20a and the second surface 20b of the metal plate 20, regions where an edge portion 20c and the first sealing portion 21 overlap each other are roughened in the same manner as the surface of the metal plate 15. The roughened regions may be only the regions where the edge portion 20c and the first sealing portion 21 are bonded to each other; however, in the present embodiment, the first surface 20a and the second surface 20b of the metal plate 20 are entirely roughened.

Figure 6:
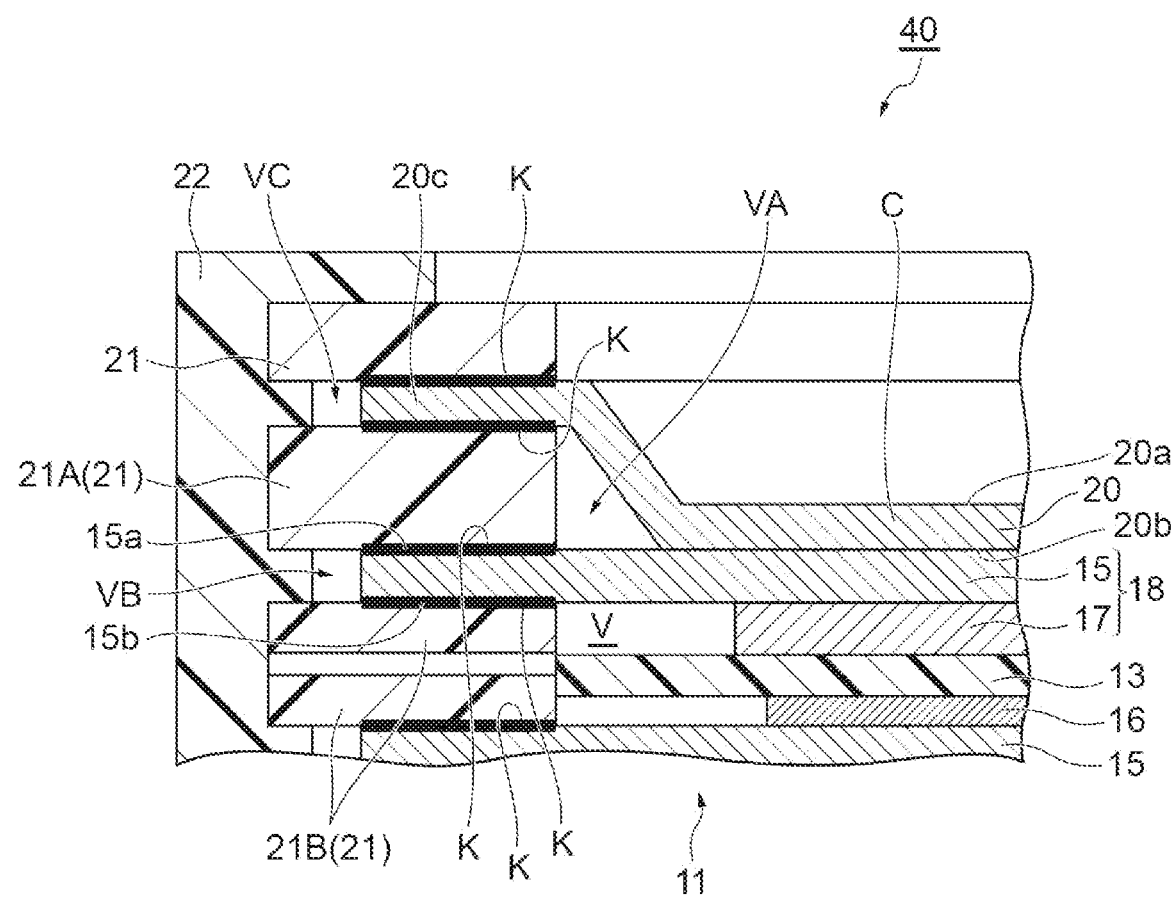
FIG. 6 is an enlarged sectional view of a main part of the power storage module shown in FIG. 5.

As shown in FIG. 6, the first sealing portions 21 are bonded to the edge portion 20c on the first surface 20a and the second surface 20b of the metal plate 20, respectively. Therefore, in the power storage module 40, a surplus space (second surplus space) VA surrounded by the first sealing portion 21, the metal plate 15 of the negative terminal electrode 18, and the metal plate 20 is formed. The surplus space VA is formed to surround the circumference of the contact portion C when seen in the laminating direction D. In addition, the surplus space VA has a substantially triangular shape having a height (the dimension along the laminating direction D) that decreases from the first sealing portion 21 side toward the contact portion C side when seen in a section taken along the laminating direction D. The inside of the surplus space VA is depressurized, and the internal pressure of the surplus space VA is lower than the atmospheric pressure. The internal pressure of the surplus space VA may be lower than the internal pressure of the internal space V where the electrolytic solution is housed. As an example, the internal pressure of the surplus space VA can be set to 0 MPa or higher and 0.1 MPa or lower, and the internal pressure of the internal space V can be set to 0.1 MPa or higher and 1 MPa or lower. In the present embodiment, the internal pressure of the internal space V is approximately the atmospheric pressure in a state where no internal gas is generated.

In addition, as shown in FIG. 6, the power storage module 40 further has a surplus space (third surplus space) VC where the electrolytic solution is not housed. The surplus space VC is positioned outside the surplus space VA with respect to the laminating direction D. The surplus space VC is surrounded by the metal plate 20, the first sealing portions 21, and the second sealing portion 22. The surplus space VC is formed to surround the outside of the edge portion 20c of the metal plate 20.

As described above, in the power storage module 40, the surplus space VB surrounded by the sealing body 12 and the metal plate 15 of the negative terminal electrode 18 is formed. The surplus space VB is positioned on the migration path of the electrolytic solution that propagates on the metal plate 15 of the negative terminal electrode 18 from the internal spaces V and flows out of the power storage module 40 due to the alkaline creep phenomenon. Therefore, in the power storage module 40, the fluctuation of the humidity in the internal spaces caused by the infiltration of external moisture is more effectively prevented, and it is possible to prevent the electrolytic solution from seeping out of the power storage module 40 due to the alkaline creep phenomenon.

In addition, in the power storage module 40, the electrode laminate 11 further has the metal plate 20 disposed outside the metal plate 15 of the negative terminal electrode 18 in the laminating direction D. Furthermore, in the power storage module 40, the surplus space VA surrounded by the sealing body 12, the metal plate 15 of the negative terminal electrode 18, and the metal plate 20 is further provided. In addition to the surplus space VB, the surplus space VA is further provided on the migration path of the electrolytic solution attributed to the alkaline creep phenomenon, whereby the fluctuation of the humidity in the internal spaces V caused by the infiltration of external moisture is more effectively prevented.

In addition, in the power storage module 40, the internal pressure of the surplus space VA is lower than the atmospheric pressure. Therefore, it is possible to decrease the amount of moisture present in the surplus space VA. Therefore, it is possible to make the progress condition of the alkaline creep phenomenon far less likely to be satisfied.

In addition, in the power storage module 40, the surplus space VC surrounded by the sealing body 12 and the metal plate 20 is further provided. In addition to the surplus spaces VA and VB, the surplus space VC is further provided on the migration path of the electrolytic solution attributed to the alkaline creep phenomenon, whereby the fluctuation of the humidity in the internal spaces V caused by the infiltration of external moisture is more effectively prevented.

Figure 7:
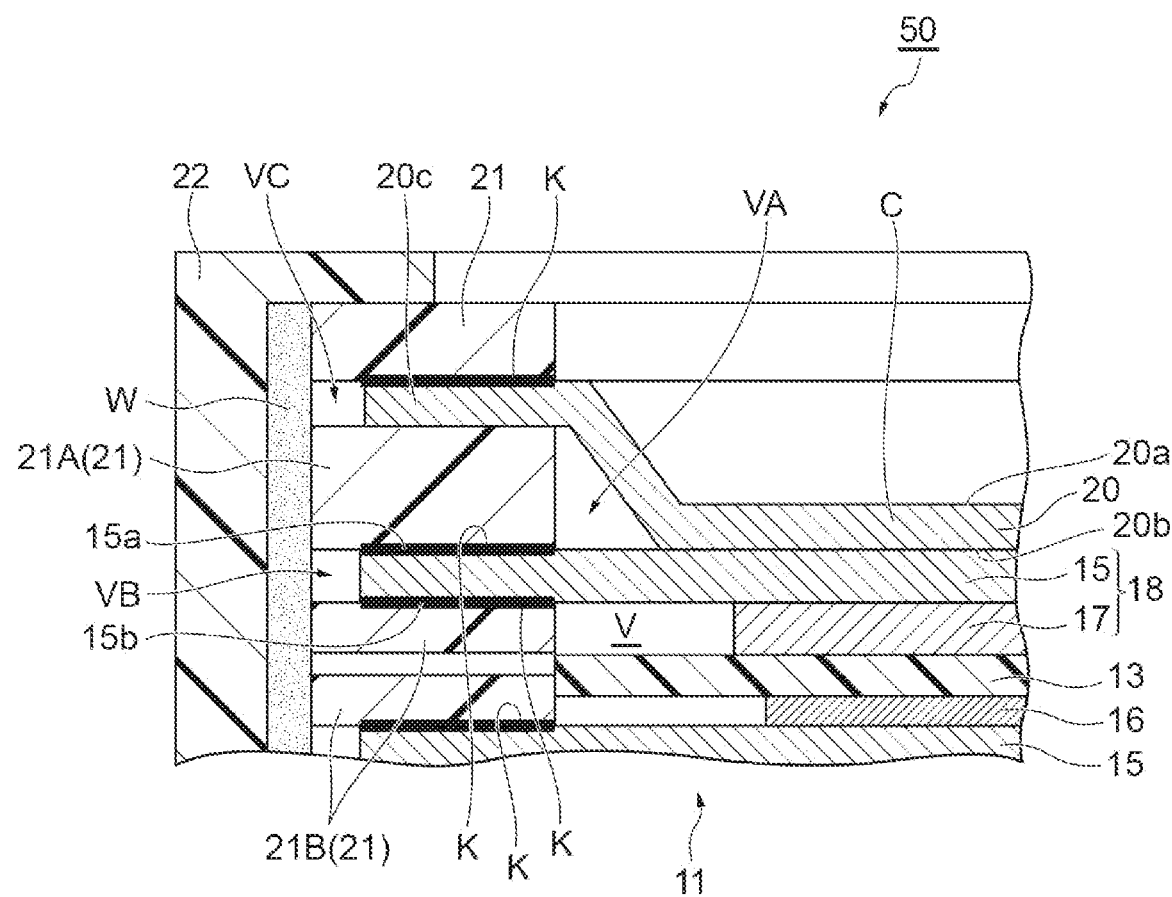
FIG. 7 is an enlarged sectional view of a main part of a power storage module according to another modification example.

Next, a power storage module 50 according to another modification example will be described with reference to FIG. 7. FIG. 7 is an enlarged sectional view of a part of the power storage module 50 according to another modification example. As shown in FIG. 7, the power storage module 50 includes, similar to the power storage modules 4 and 40, the electrode laminate 11 and the resin sealing bodies 12 configured to seal the electrode laminate 11. The electrode laminate 11 is made up of a plurality of electrodes laminated along the laminating direction D through the separators 13. These electrodes include the laminate of the plurality of bipolar electrodes 14, the negative terminal electrode 18, and the positive terminal electrode 19. In addition, the power storage module 50 has, similar to the power storage module 40, three surplus spaces VA, VB, and VC on the migration path of the electrolytic solution attributed to the alkaline creep phenomenon.

The power storage module 50 is different from the power storage module 40 in terms of the fact that the outer edge portions of the first sealing portions 21 adjacent to each other in the laminating direction D are bonded to each other with a heat welding layer W. The heat welding layer W is formed by, for example, hot plate welding. Due to the heat welding layer W, in the power storage module 50, the surplus space VB is in a state of being surrounded by the first sealing portions 21 and the metal plate 15 of the negative terminal electrode 18. Similarly, the surplus space VC is in a state of being surrounded by the first sealing portions 21 and the metal plate 20.

In the power storage module 50 as well, the surplus spaces VA, VB, and VC are provided on the migration path of the electrolytic solution attributed to the alkaline creep phenomenon. Therefore, in the power storage module 50 as well, the fluctuation of the humidity in the internal spaces V caused by the infiltration of external moisture is effectively prevented, and it is possible to prevent the electrolytic solution from seeping out of the power storage module 50 due to the alkaline creep phenomenon.

In addition, in the power storage module 50, the outer edge portions of the first sealing portions 21 adjacent to each other in the laminating direction D are bonded to each other with the heat welding layer W. The outer edge portions of the first sealing portions 21 adjacent to each other are bonded to each other, whereby the surplus space VB formed by the sealing body 12 and the metal plate 15 of the negative terminal electrode 18 is in a state of being surrounded by the first sealing portions 21 and the metal plate 15 of the negative terminal electrode 18. Similarly, the separate surplus space VC formed by the sealing body 12 and the metal plate 20 is in a state of being surrounded by the first sealing portions 21 and the metal plate 20. According to this configuration, it is possible to change the dimensions (the dimensions in a direction intersecting the laminating direction D) of the first sealing portions 21 after heat welding by, for example, adjusting the hot plate-pressing intensity and adjusting the welding amounts of the outer edge portions of the individual first sealing portions 21 by heat welding. Therefore, it is possible to adjust the sizes of the surplus space VB and the surplus space VC.

The present disclosure is not limited to the above-described embodiments, and a variety of modifications are applicable. For example, in the above-described embodiments, the example where the internal pressure of the surplus space VA is lower than the atmospheric pressure has been described, but the internal pressure of the surplus space VA may not be lower than the atmospheric pressure. In addition, the internal pressures of the surplus spaces VB and VC also may be lower than the atmospheric pressure. Furthermore, in the above-described embodiments, the example where the power storage module 4 has one surplus space VB and the example where the power storage modules 40 and 50 have three surplus spaces VA, VB, and VC have been described, but the power storage modules 4, 40, and 50 may have more surplus spaces. The surplus spaces VA, VB, and VC simply need to be disposed on the migration path of the electrolytic solution when the alkaline creep phenomenon occurs, and the configuration elements of the power storage module that form each of the surplus spaces VA, VB, and VC are not particularly limited.

In addition, a rectangular frame-shaped first sealing portion 21 may be bonded to the second surface 15b side of the metal plate 15 of the positive terminal electrode 19. This first sealing portion 21 can also be bonded to other first sealing portions 21 with the second sealing portions 22. In addition, the edge portion of the first sealing portion 21 bonded to the second surface 15b side of the metal plate 15 of the positive terminal electrode 19 and the edge portion of the first sealing portion 21 on the first surface 15a side of the metal plate 15 of the positive terminal electrode 19 may be bonded to each other by heat welding.

Figure 8:
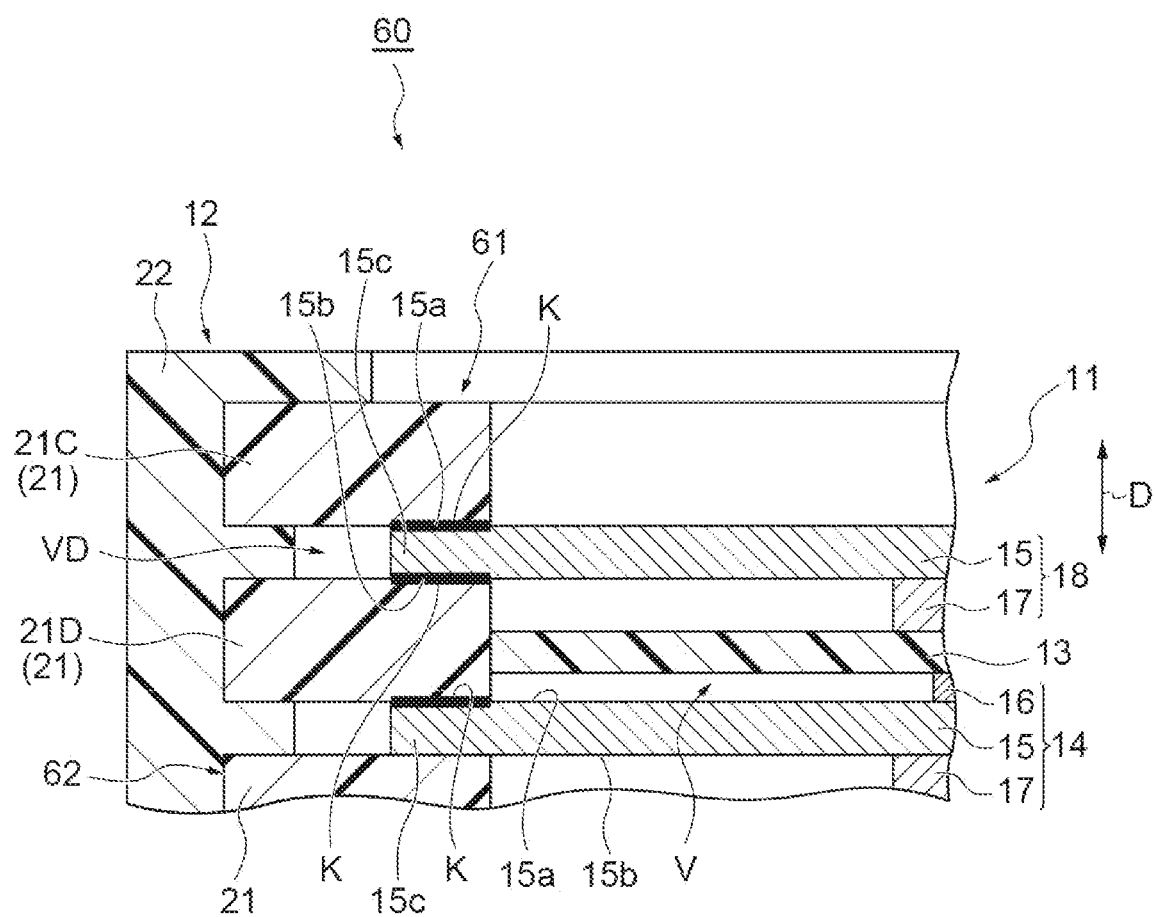
FIG. 8 is an enlarged sectional view of a main part of a power storage module according to still another modification example.

FIG. 8 is an enlarged sectional view of a main part of a power storage module according to still another modification example. As shown in FIG. 8, the electrode laminate 11 of a power storage module 60 includes a negative terminal electrode unit 61 including one bipolar electrode 14 and the negative terminal electrode 18 and a bipolar electrode unit 62 including a plurality of the bipolar electrodes 14. The negative terminal electrode unit 61 is bonded to one end of the bipolar electrode unit 62. The negative terminal electrode unit 61 is a unit where the negative terminal electrode 18 is laminated on the bipolar electrode 14 through the separator 13. The bipolar electrode unit 62 is a unit where a plurality of the bipolar electrodes 14 are laminated through the separator 13. In the electrode laminate 11, the bipolar electrode 14 of the negative terminal electrode unit 61 is laminated on the bipolar electrode 14 on one end side of the bipolar electrode unit 62 across the separator 13 along the laminating direction D.

The first sealing portion 21 includes a first sealing portion (first resin portion) 21C bonded to the edge portion 15c on the first surface 15a of the metal plate 15 of the negative terminal electrode 18 and a first sealing portion (second resin portion) 21D bonded to the edge portion 15c on the second surface 15b of the metal plate 15 of the negative terminal electrode 18. The first sealing portion 21C and the first sealing portion 21D are both included in the negative terminal electrode unit 61.

The first sealing portion 21C is welded to the entire circumference of the edge portion 15c on the first surface 15a of the metal plate 15 of the negative terminal electrode 18. In the first sealing portion 21C, the surface opposite to the surface that bonds to the first surface 15a of the negative terminal electrode 18 is bonded to the second sealing portion 22. The first sealing portion 21D is sandwiched between the edge portion 15c of the metal plate 15 of the negative terminal electrode 18 and the edge portion 15c of the metal plate 15 of the bipolar electrode 14. The first sealing portion 21D is welded to the entire circumference of the edge portion 15c on the second surface 15b of the metal plate 15 of the negative terminal electrode 18. In addition, the first sealing portion 21D is welded to the entire circumference of the edge portion 15c on the first surface 15a of the metal plate 15 of the bipolar electrode 14 that faces the negative terminal electrode 18.

In the negative terminal electrode unit 61, a surplus space (first surplus space) VD other than the internal spaces V is formed by the sealing body 12 and the metal plate 15 of the negative terminal electrode 18. The surplus space VD is a space surrounded by the first sealing portion 21C, the first sealing portion 21D, the edge portion 15c of the metal plate 15 of the negative terminal electrode 18, and the second sealing portion 22. The surplus space VD is provided on the migration path of the electrolytic solution when the alkaline creep phenomenon occurs in the power storage module 60. The surplus space VD is formed to surround the circumference of the metal plate 15 of the negative terminal electrode 18 when seen in the laminating direction D. In addition, the surplus space VD has a substantially rectangular shape when seen in a section taken along the laminating direction D.

Figure 9:
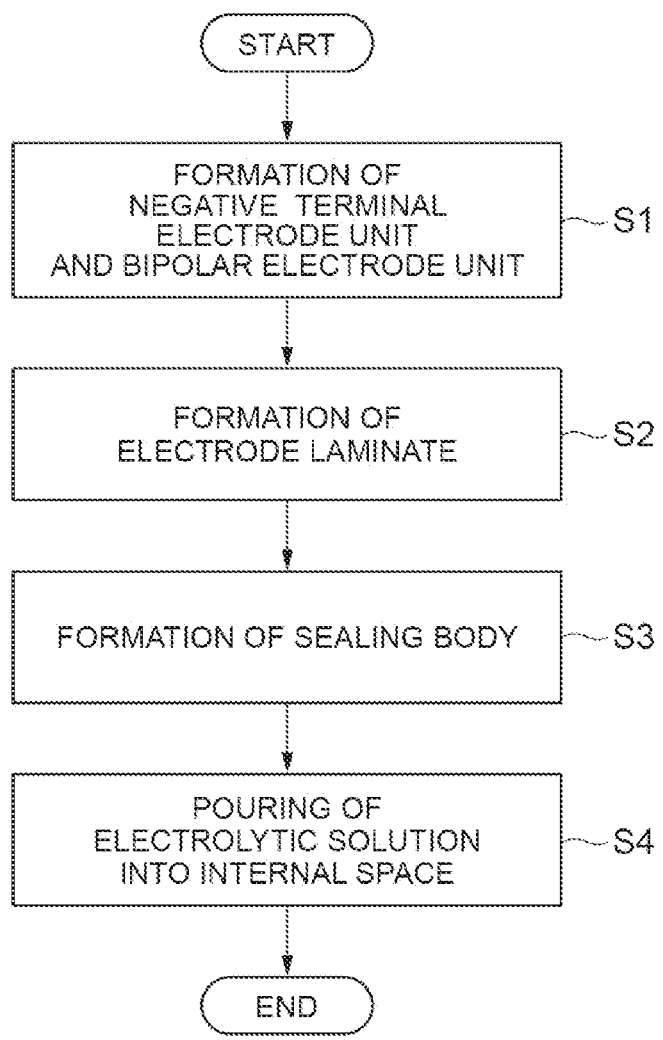
FIG. 9 is a flowchart showing an example of a manufacturing method of the power storage module shown in FIG. 8.

Next, an example of a manufacturing method of the power storage module 60 will be described with reference to FIG. 9. FIG. 9 is a flowchart showing an embodiment of the manufacturing method of the above-described power storage module.

In the manufacturing of the power storage module 60, first, the negative terminal electrode unit 61 and the bipolar electrode unit 62 are formed, respectively (Step S1). In the formation of the negative terminal electrode unit 61, one bipolar electrode 14 in which the first sealing portion 21D is welded to the edge portion 15c on the first surface 15a of the metal plate 15 and the negative terminal electrode 18 in which the first sealing portion 21C is welded to the edge portion 15c on the first surface 15a of the metal plate 15 are prepared. Next, the negative terminal electrode 18 and the bipolar electrode 14 are laminated through the separator 13. In addition, the first sealing portion 21D welded to the edge portion 15c on the first surface 15a of the metal plate 15 of the bipolar electrode 14 is welded to the edge portion 15c on the second surface 15b of the metal plate 15 of the negative terminal electrode 18. As a result, the negative terminal electrode unit 61 is formed.

In the formation of the bipolar electrode unit 62, a plurality of the bipolar electrodes 14 each having the first sealing portion 21 welded to the edge portion 15c on the first surface 15a of the metal plate 15 and the positive terminal electrode 19 in which the first sealing portions 21 are welded to both edge portions 15c on the first surface 15a and the second surface 15b of the metal plate 15 are prepared. Next, the plurality of bipolar electrodes 14 are laminated through the separator 13 to obtain a laminate, and the positive terminal electrode 19 is laminated on one end of the laminate in the laminating direction of the bipolar electrodes 14. As a result, the bipolar electrode unit 62 is formed.

Next, the negative terminal electrode unit 61 is laminated on the bipolar electrode 14 provided at the end portion of the bipolar electrode unit 62 opposite to the positive terminal electrode 19 to form the electrode laminate 11 (Step S2). At this time, the bipolar electrode 14 of the negative terminal electrode unit 61 is laminated on the bipolar electrode 14 provided at the end portion of the bipolar electrode unit 62 through the separator 13.

Next, the electrode laminate 11 is disposed in a mold for injection molding (not shown), and a molten resin is injected into the mold, thereby forming the sealing body 12 (Step S3). Here, the second sealing portions 22 are formed by injection molding to surround the individual first sealing portions 21, and the electrode laminate 11 is sealed. As a result, the surplus spaces VD surrounded by the sealing body 12 and the metal plate 15 of the negative terminal electrode 18 are sealed with the sealing body 12 together with the internal spaces V. After the formation of the sealing body 12, the electrolytic solution is poured into the internal spaces V between the bipolar electrodes 14 and 14 (Step S4). The power storage module 60 is obtained with the above-described steps.

As described above, in this power storage module 60, the first sealing portion 21C (first resin portion) is bonded to the first surface 15a of the metal plate 15 of the negative terminal electrode 18, and the first sealing portion 21D (second resin portion) is bonded to the second surface 15b of the metal plate 15 of the negative terminal electrode 18. According to this configuration, the surplus space VD formed on the migration path of the electrolytic solution attributed to the alkaline creep phenomenon is sealed with the first sealing portion 21C and the first sealing portion 21D. Therefore, the fluctuation of the humidity in the internal spaces V caused by the infiltration of external moisture is prevented, which makes the progress condition of the alkaline creep phenomenon less likely to be satisfied. In addition, in the power storage module 60, the first sealing portion 21D is bonded to both the metal plate 15 of the negative terminal electrode 18 and the metal plate 15 of the bipolar electrode 14, whereby the stiffness of the first sealing portion 21D is enhanced. Therefore, it is possible to prevent the first sealing portion 21D from peeling off from the metal plate 15 of the negative terminal electrode 18 due to the infiltration of the electrolytic solution attributed to the alkaline creep phenomenon.

In addition, in the power storage module 60, the metal plate 15 of the negative terminal electrode 18 is roughened in the bonding region with the first sealing portion 21C and the bonding region with the first sealing portion 21D. According to this configuration, the bonding strengths between the first sealing portion 21C and the metal plate 15 of the negative terminal electrode 18 and between the first sealing portion 21D and the metal plate 15 of the negative terminal electrode 18 are improved with the anchor effect. Therefore, it is possible to prevent the first sealing portion 21C and the first sealing portion 21D from peeling off from the metal plate 15 of the negative terminal electrode 18 due to the infiltration of the electrolytic solution and to prevent the progress of the alkaline creep phenomenon.

Figure 10:
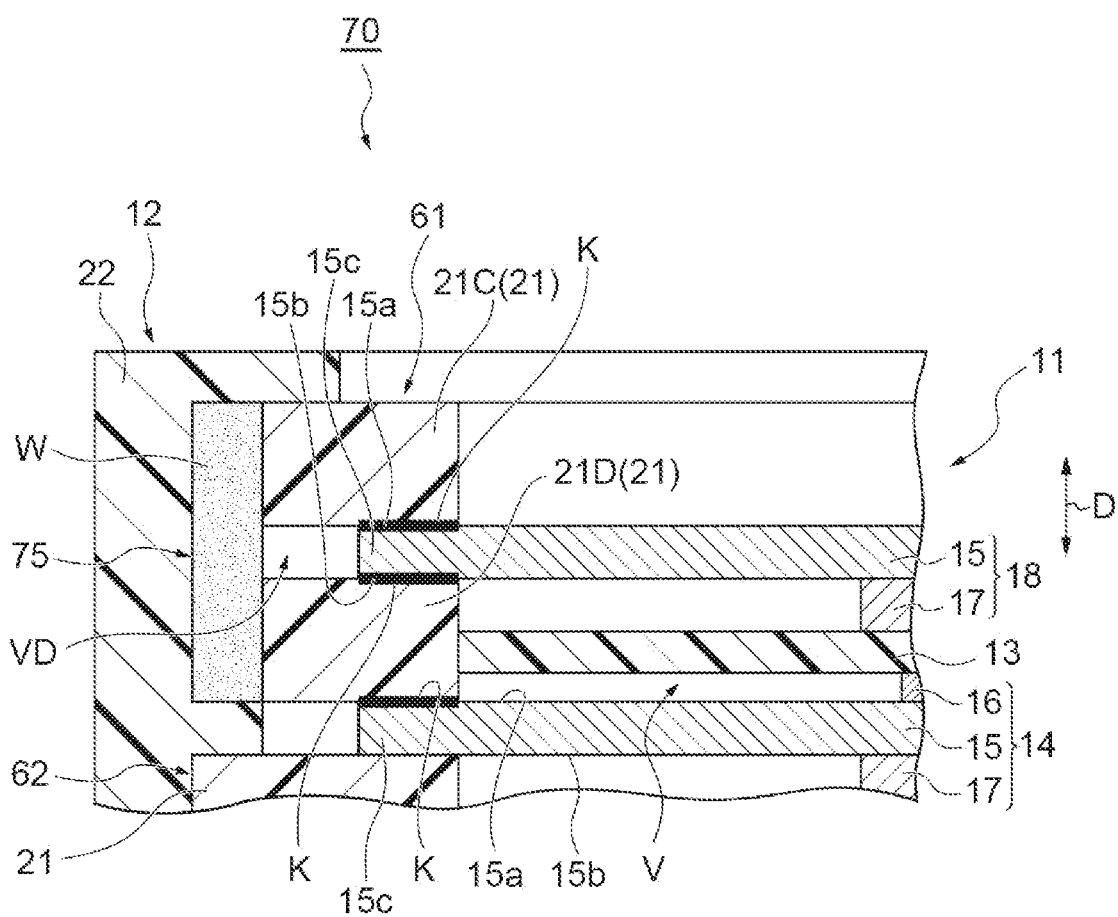
FIG. 10 is an enlarged sectional view of a main part of the power storage module according to still another modification example.

FIG. 10 is an enlarged sectional view of a main part of the power storage module according to still another modification example. A power storage module 70 shown in FIG. 10 is different from the power storage module 60 in terms of the fact that the first sealing portion 21C and the first sealing portion 21D are turned into an integrally bonded body 75 by heat welding.

More specifically, in the power storage module 70, the outer edge portion of the first sealing portion 21C and the outer edge portion of the first sealing portion 21D are bonded to each other with the heat welding layer W, whereby the integrally bonded body 75 is formed. The heat welding layer W is formed by, for example, hot plate welding. The heat welding layer W has a substantially rectangular frame shape when seen in the laminating direction D and is continuously provided throughout the entire circumference of the edge portion 15c of the metal plate 15 of the negative terminal electrode 18. Therefore, in the power storage module 70, the surplus space VD surrounded by the bonded body 75 and the metal plate 15 of the negative terminal electrode 18 is sealed with the sealing body 12.

A manufacturing method of the power storage module 70 is different from the manufacturing method of the power storage module 60 in terms of the fact that the manufacturing method includes the heat welding of the first sealing portion 21C and the first sealing portion 21D. In the manufacturing method of the power storage module 70 as well, similar to the manufacturing method of the power storage module 60, the negative terminal electrode unit 61 and the bipolar electrode unit 62 are formed, respectively. At the time of forming the negative terminal electrode unit 61, the first sealing portion 21C is bonded to the edge portion 15c on the first surface 15a of the metal plate 15 of the negative terminal electrode 18, and the first sealing portion 21D is bonded to the edge portion 15c on the second surface 15b of the metal plate 15 of the negative terminal electrode 18 and the edge portion 15c on the first surface 15a of the metal plate 15 of the bipolar electrode 14.

After the bonding of the first sealing portion 21C and the first sealing portion 21D, the outer edge portion of the first sealing portion 21C and the outer edge portion of the first sealing portion 21D are welded together by, for example, hot plate welding. Therefore, the outer edge portion of the first sealing portion 21C and the outer edge portion of the first sealing portion 21D are bonded to each other with the heat welding layer W, and the first sealing portion 21C and the first sealing portion 21D are turned into the integrally bonded body 75. According to such a manufacturing method, since the configurations around the negative terminal electrode 18 can be unitized by turning the first sealing portion 21C and the first sealing portion 21D into the integrally bonded body 75, the manufacturing of the power storage module 70 is simplified.

The order of the heat welding of the first sealing portion 21C and the first sealing portion 21D is not limited to the above-described order. For example, the first sealing portion 21C may be bonded to the first surface 15a of the metal plate 15 of the negative terminal electrode 18, and the first sealing portion 21D may be bonded to the second surface 15b of the metal plate 15 of the negative terminal electrode 18 and the first surface 15a of the metal plate 15 of the bipolar electrode 14 after the heat welding of the first sealing portion 21C and the first sealing portion 21D. In addition, the first sealing portion 21C and the first sealing portion 21D may be heat welded after the formation of the electrode laminate 11 and before the injection molding of the second sealing portion 22. In any cases, since the configurations around the negative terminal electrode 18 can be unitized, the manufacturing of the power storage module 70 is simplified.

REFERENCE SIGNS LIST 4, 40, 50, 60, 70: power storage module, 11: electrode laminate, 11a: side surface, 12: sealing body, 14: bipolar electrode, 15: metal plate, 15a: first surface, 15b: second surface, 18: negative terminal electrode. 020: metal plate (outermost metal plate), 20c: edge portion, 21, 21A, 21B: first sealing portion (resin portion), 21C: first sealing portion (first resin portion), 21D: first sealing portion (second resin portion), 22: second sealing portion, 61: negative terminal electrode unit, 62: bipolar electrode unit, 75: bonded body, D: laminating direction, K: bonding region, V: internal space, VA: surplus space (second surplus space), VB, VD: surplus space (first surplus space), VC: surplus space (third surplus space).

The invention claimed is:

1. A power storage module comprising: an electrode laminate including a laminate of a plurality of bipolar electrodes each having a positive electrode active material layer on a first surface of a metal plate and having a negative electrode active material layer on a second surface of the metal plate and a negative terminal electrode having a negative electrode active material layer on a first surface of a metal plate and disposed on one end side of the laminate in a laminating direction; a sealing body provided to surround a side surface of the electrode laminate and sealing an internal space formed between electrodes adjacent to each other in the laminating direction; and an electrolytic solution containing an alkaline solution that is housed in the internal space, wherein surfaces of the metal plate of the negative terminal electrode are bonded to the sealing body, the sealing body comprises a first sealing portion welded to an edge of the metal plate of the negative terminal electrode and a second sealing portion welded to an edge of the first sealing portion, a first surplus space surrounded by the sealing body and the metal plate of the negative terminal electrode is present, the first sealing portion comprises a first resin portion bonded to the first surface of the metal plate of the negative terminal electrode and a second resin portion bonded to a second surface of the metal plate of the negative terminal electrode, the first resin portion and the second resin portion forms an integrally bonded body based on heat welding, and the first surplus space is separate from the internal space and sealed by the bonded body and the metal plate of the negative terminal electrode.

2. The power storage module according to claim 1, wherein the electrode laminate has an outermost metal plate disposed outside the metal plate of the negative terminal electrode in the laminating direction,
a surface of the outermost metal plate that faces the metal plate side of the negative terminal electrode is bonded to the sealing body,
a second surplus space surrounded by the sealing body, the metal plate of the negative terminal electrode, and the outermost metal plate is further present,
the outermost metal plate has no active material,
the second surplus space is sealed by the sealing body, the metal plate of the negative terminal electrode, and the outermost plate, and
the second surplus space is separate from the internal space.

3. The power storage module according to claim 2, wherein an internal pressure of the second surplus space is lower than an atmospheric pressure.

4. The power storage module according to claim 2, wherein a surface of the outermost metal plate opposite to the surface that faces the metal plate side of the negative terminal electrode is bonded to the sealing body,
a third surplus space surrounded by the sealing body and the outermost metal plate is further present, the third surplus space is sealed by the sealing body and the outermost metal plate, and the third surplus space is separate from the internal space.

5. The power storage module according to claim 1, wherein the metal plate of the negative terminal electrode is roughened in a bonding region with the sealing body.

6. The power storage module according to claim 1, wherein the sealing body includes a plurality of resin portions respectively disposed at edge portions of the metal plates, and outer edge portions of the individual resin portions are bonded to each other by heat welding.

7. The power storage module according to claim 1, wherein the second resin portion is further bonded to the metal plate of the bipolar electrode adjacent to the negative terminal electrode.

8. The power storage module according to claim 7, wherein the metal plate of the negative terminal electrode is roughened in a bonding region with at least one of the first resin portion and the second resin portion.

9. A manufacturing method of a power storage module, the method comprising:

forming a bipolar electrode unit including a laminate of a plurality of bipolar electrodes each having a positive electrode active material layer on a first surface of a metal plate and a negative electrode active material layer on a second surface of the metal plate;

forming a negative terminal electrode unit including a negative terminal electrode having a negative electrode active material layer on a first surface of a metal plate and the bipolar electrode;

bonding the negative terminal electrode unit to one end side of the bipolar electrode unit in a laminating direction of the laminate and forming an electrode laminate including the plurality of bipolar electrodes and the negative terminal electrode; and forming a sealing body to surround a side surface of the electrode laminate and sealing an internal space formed between electrodes adjacent to each other in the laminating direction in the electrode laminate, wherein both surfaces of the metal plate of the negative terminal electrode are bonded to the sealing body, thereby sealing a surplus space other than the internal space with the sealing body, in the forming of the negative terminal electrode unit, a first resin portion configuring the sealing body is bonded to the first surface of the metal plate of the negative terminal electrode in the negative terminal electrode unit, and a second resin portion configuring the sealing body is bonded to a second surface of the metal plate of the negative terminal electrode in the negative terminal electrode unit, forming the first sealing portion comprises forming a first resin portion bonded to a first surface of the metal plate of the negative terminal electrode and a second resin portion bonded to a second surface of the metal plate of the negative terminal electrode, in the forming of the negative terminal electrode unit, the first resin portion and the second resin portion are turned into an integrally bonded body by heat welding, and the surplus space is separate from the internal space and sealed by the bonded body and the metal plate of the negative terminal electrode.

10. The manufacturing method of a power storage module according to claim 9, wherein, in the forming of the negative terminal electrode unit, the second resin portion configuring the sealing body is further bonded to a first surface of the metal plate of the bipolar electrode.

11. The manufacturing method of a power storage module according to claim 10, wherein, between the forming of the electrode laminate and the sealing of the internal space, the first resin portion and the second resin portion are turned into the integrally bonded body by heat welding.

12. The power storage module according to claim 1, wherein the first surplus space does not include electrolytes.

* * * * *